Oct. 30, 1962  R. HINDS  3,060,976
TRANSPOSING HEADS FOR USE IN THE MANUFACTURE OF
TRANSPOSED MULTIPLE STRIP CONDUCTOR
Filed Aug. 24, 1959  4 Sheets-Sheet 2
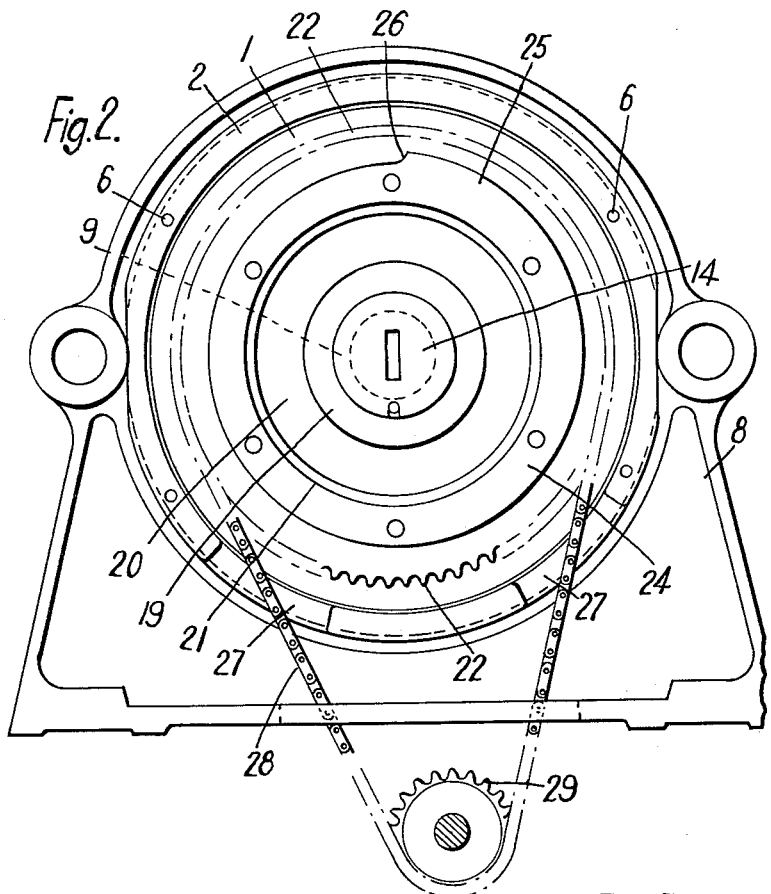
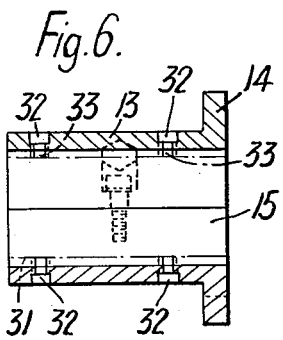 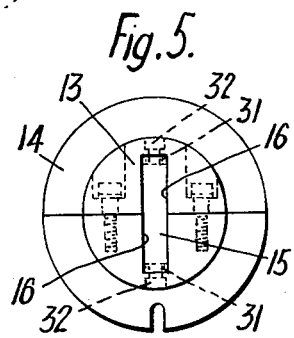
Inventor
Ronald Hinds
By
Webb Mackey & Burden
Attorney

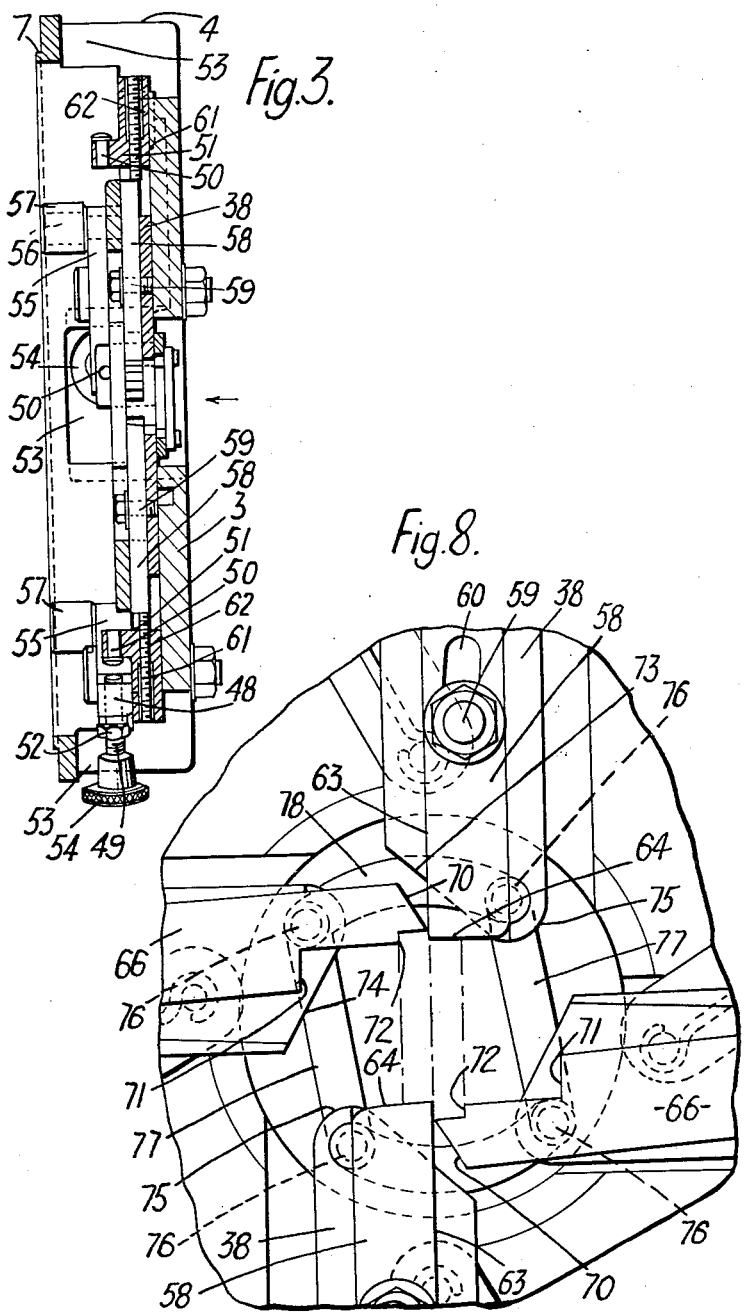

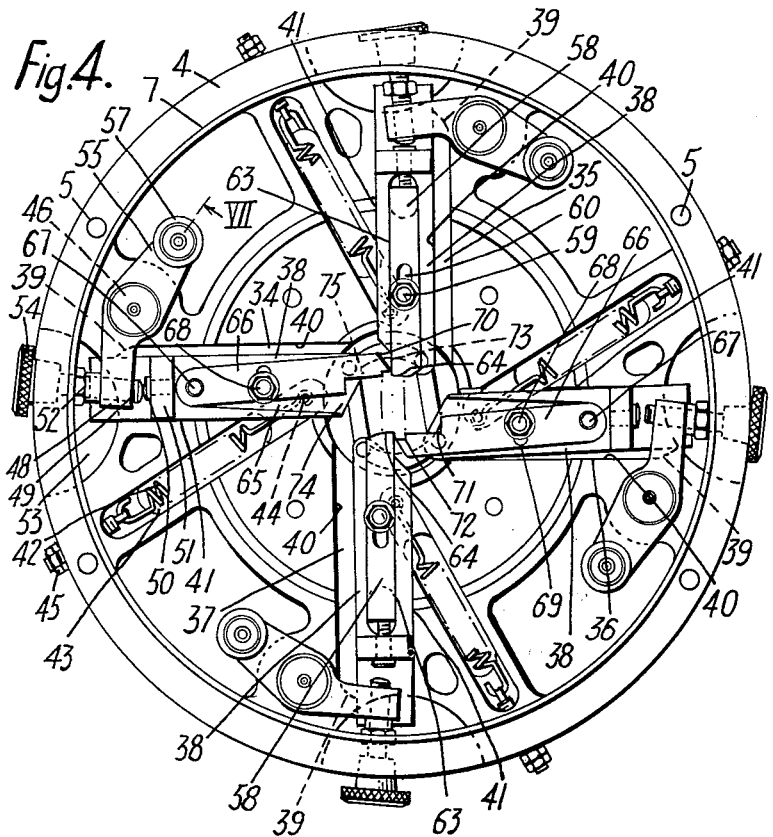

3,060,976
TRANSPOSING HEADS FOR USE IN THE MANU-
FACTURE OF TRANSPOSED MULTIPLE STRIP
CONDUCTOR

Ronald Hinds, Stockton Heath, England, assignor to
British Insulated Callender's Cables Limited, London,
England, a British company
Filed Aug. 24, 1959, Ser. No. 835,772
Claims priority, application Great Britain Aug. 25, 1958
10 Claims. (Cl. 140—71)

This invention relates to the manufacture of a known type of transposed multiple strip conductor of substantially rectangular cross-section, that is to say to the manufacture of a conductor built up of a plurality of wires of rectangular cross-section grouped together to form a composite conductor of substantially rectangular form in which the position of each component wire of the group or, in the case of a conductor comprising a core wire or group of wires and an outer group of wires, of each component wire of at least the outer group, changes step-by-step along the length of the conductor so that each wire occupies every position in its group in turn.

Where such conductors comprise an even number of wires arranged in two stacks transposition is effected by moving one stack relative to the other by the height of two wires to leave one wire at the top of one stack projecting above the top of the other stack and one wire at the bottom of the other stack projecting below the bottom of the first stack, moving the projecting wires across from one stack to the other, again moving one stack relative to the other in the same direction as before, and then moving the projecting wires across from one stack to the other, and repeating the cycle of operations as the conductor advances from the transposition point. A complete transposition is effected in $2n$ operations where $n$ is the number of wires in the conductor.

Where there is an odd number of wires arranged in two stacks, with one less wire in one stack than in the other, transposition is effected in much the same way except that the stacks are moved relative to one another by the height of only one wire and that there is only one projecting wire to move across at a time. As a result a complete transposition involves $4n$ operations where $n$ is the number of wires in the conductor. Transposition of an outer layer of wires around a rectangular core is effected in the same manner.

The manufacture of such transposed multiple strip conductor accordingly usually involves a stranding operation in which the bobbins carrying the supplies of wire are caused to move in a circular orbit around the axis of a forming or closing die into which the wires are led and from which they are drawn off by a capstan or other appropriate haul-off device. The bobbins are constrained to orbit with their respective axes held parallel to a fixed plane (for instance a horizontal plane) containing the machine axis and the wires, instead of taking a true helical path as in the case of the wires of a circular conductor built up of circular wires, each travel round the conductor closing die axis in a path comprising a succession of short straight portions which are connected by fairly sharp bends involving a forcible bending of the wires at frequent intervals along their lengths, this latter operation having been effected in a transposing head by cam actuated fingers which exert sufficient lateral pressure on the appropriate wire or wires to bend it or them into place as they enter a stationary rectangular closing die.

By the present invention we provide an improved form of transposing head that is capable of being used for the manufacture of a range of transposed multiple strip conductors which differ as regards the number and size of the component wires of rectangular cross-section of which they are formed.

In a transposing head in accordance with our invention transposition of the wires of a multiple strip conductor comprising two neighbouring stacks of rectangular section wires or of an outer layer of rectangular section wires around a rectangular core in a multiple strip conductor is effected by means of four movable fingers having ends which are each adapted to engage one of the four component wires of the four corners of the multiple strip conductor. Each finger is mounted in one of a group of four carriers. Two of these carriers, which each carry one of a diagonal pair of fingers (i.e. two fingers for engaging two diagonally opposite corner wires of a conductor), are resiliently held on slide beds extending parallel with two opposite side walls of the closing die of the head so as to be capable of sliding towards and away from and in a plane normal to the axis of the rectangular closing die. The remaining two carriers, which each carry one of a pair of fingers for engaging the other diagonally opposite corner wires of the conductor, are resiliently held on slide beds extending parallel with the other two side walls of the rectangular closing die so as to be capable of sliding towards and away from and in a plane normal to the axis of the die, in a direction at right angles to the direction of sliding movement of the first two carriers. All of these carriers are capable of being lifted off their slide beds at their inner ends so as to pivot about their outer ends in the same sense i.e. in a direction counter to the direction of transposition. The fingers of one diagonal pair are mounted in their respective carriers so as to be longitudinally adjustable with respect to their carriers; the fingers of the other pair are mounted in their respective carriers so as to be adjustable laterally with respect to their carriers and each of the four fingers is adapted to be positively impelled along its slide bed towards the closing die axis by a rotatably driven ring cam acting on the carriers through means permitting adjustment of the "lift" imparted by the cam to each carrier to suit the height or width of the component wires to be transposed.

By providing for longitudinal adjustment of the one pair of fingers we are able to arrange for the distance between the ends of these fingers to be adjusted to an infinitely variable extent within limits to suit not only a variation in the stack height due to a change in the number of wires in the stack but also those due to changes in the thickness of the rectangular wires or strips in the stack. By providing for lateral adjustment of the other pair of fingers in their carriers we are able to arrange for similar adjustment of the distance in the direction of the height of the stack between the notched ends of that other pair of fingers.

For the purpose of imparting support to parts of a multiple strip conductor whilst other parts of that conductor are being given a transposition stops may be provided to limit movement of the carriers and their fingers in outward directions. We prefer however to limit the outward movements of the four carriers by coupling the inner end of each carrier to the inner ends of the adjacent carriers by pivotally secured links—the four carriers being thus inter-connected by means of four links which together constitute a parallelogram of links. This arrangement has the advantage that a cam imparted inward movement of one carrier designed to displace one stack of wires relative to the rest or to displace one wire or one layer of wires from one stack to another stack, ensures that the finger at the opposite end of the stack or on the opposite side of the wire or layer of wires displaced, as the case may be, moves outwards automatically to permit the transposition to take place instead of being pushed aside by the stack or by the wire or layer of wires itself.

Adjustment of the strokes of the carriers to suit, in one case the thickness of the individual wires or strips and in the other case the width of the individual wires or strips is preferably provided for by arranging for the rotatably driven ring cam to act on each of the carriers to depress them against the action of a resilient holding force through a centrally pivotally supported rocker arm, one end of which carries a cam roller and the other end of which has a threaded hole in which works an adjusting screw whose end is adapted to engage a surface of the carrier. In this way with a single ring cam the two carriers for the fingers for transposing one stack of wire or strips relative to the other stack or stacks can be given a stroke corresponding to the thickness of a component wire of the stack whilst the remaining two carriers can be given a stroke corresponding to the width of a component wire of the stack, simply by varying the clearances between the adjusting screws on the rocker and the surface of the carrier which they engage.

Where a conductor is required consisting of a number of stacks in one outer one of which there is always one wire fewer than in the other stack or stacks, the carriers are operated in turn, proceeding as required either in a clockwise or counter clockwise direction when viewed in the direction of travel of the conductor through the head, by means of a ring cam with a single lift extending preferably over 90° of its circumference followed by a dwell of nearly 90° and a rapid release. Where a conductor is required consisting of a number of stacks in both outer ones of which there are the same number of wires, both outer stacks are moved relative to one another simultaneously, and the top wire of one outer stack and the bottom wire of the other outer stack are pushed across simultaneously, and the carriers of one diagonal pair of fingers are operated together, followed by the simultaneous operation of the carriers of the other diagonal pair of fingers. This is effected by a ring cam having two lifts 180° apart, each lift extending preferably over 90° followed by a dwell of 90° and a rapid release. It will be understood that in both cases the ring cam will be driven in synchronism with the rotating cage carrying the floating bobbins from which the component wires are drawn off and led to the transposing head and its closing die. This may be effected by any convenient form of gearing or separate synchronous motor drives may be employed.

To enable the invention to be more fully understood a detailed description will now be given by way of example, and with reference to the accompanying drawings, of a transposing head which is constructed in accordance with the invention. The head is designed for use with a horizontal transposed strip stranding machine and to be capable of dealing with any odd number of wires up to twenty seven, arranged in two vertical stacks of which the height of the taller may vary from 0.10 inch to 1.34 inch in steps of 0.01 inch and of which the width of each stack may vary from 0.375 inch through 0.415 inch to 0.495 inch.

In the accompanying drawings:

FIGURE 2 is a view of the base as seen in the direction of the arrow in FIGURE 1;

FIGURE 3 represents a sectional view, of the so-called cover, also on the vertical palne containing the axis of the machine, the direction of movement of the wires through the machine being represented by the arrow;

FIGURE 4 is a view of the cover as seen in a direction opposite to that of the arrow in FIGURE 3;

FIGURE 5 is an enlarged end view of an element of the arrangement represented in FIGURES 1 and 2;

FIGURE 6 is a side view of the same element.

FIGURE 7 is a view of part of the arrangement shown in FIGURE 4 on the line VII in that figure and FIGURE 8 is an enlarged view of the central portion of FIGURE 4.

Figure 1:
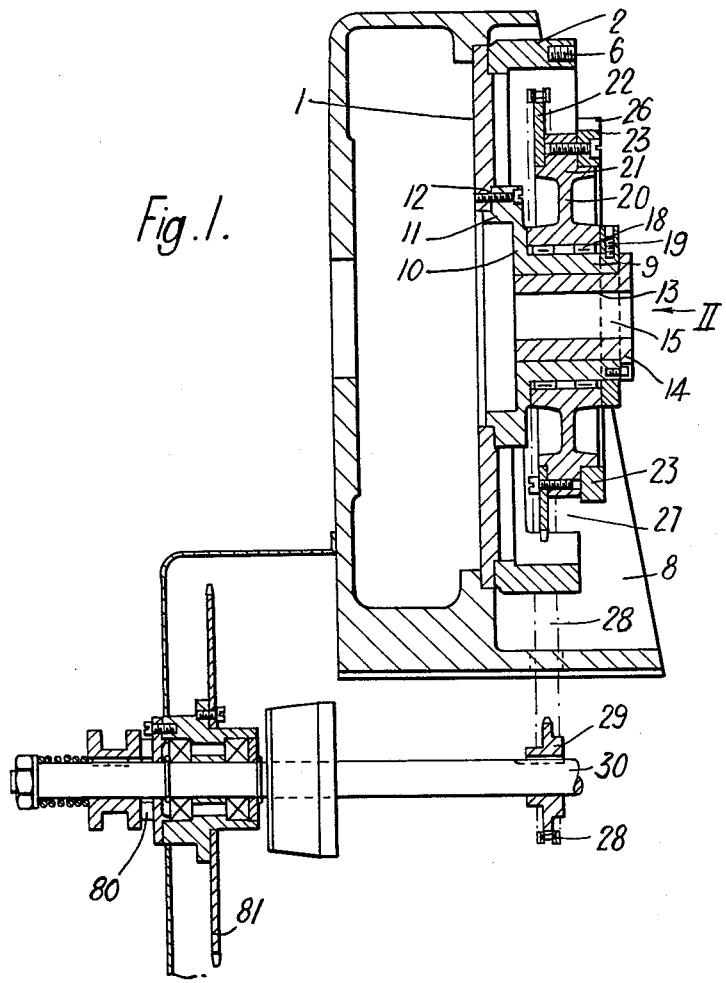
FIGURE 1 represents a sectional view, on the vertical plane containing the axis of the machine, of the so-called base, the direction of movement of the wires through the machine being represented by the arrow.

This example of the transposing head comprises an annular casing formed of two main parts, namely the base shown in FIGURES 1 and 2 and the cover shown in FIGURES 3 and 4.

The base comprises an annular end wall 1 with a circumferentially extending wall 2 upstanding from its outer peripheral edge and projecting therefrom in a direction opposite to the direction of movement of the wire. The cover also comprises an annular end wall 3 with a circumferentially extending wall 4 upstanding from its outer peripheral edge and projecting therefrom in the direction of movement of the wire. The two upstanding walls 1 and 3 are adapted to make joint, the one with the other, and to be held together by studs extending through holes 5 in the cover to engage tapped holes 6 in the base. The radially inner edge of the annular end face of the upstanding wall 4 of the cover is provided with an annular projection 7 which engages with the radially inner face of the upstanding wall 2 of the base to mutually locate the base and cover.

The base (FIGURES 1 and 2) is adapted to be mounted, as by attachment to a pedestal 8, with its axis in alignment with the axis of rotation of the cage of a strip stranding machine from which the wires progress to the transposing head in the direction of the arrows in FIGURES 1 and 3. For convenience of description it is assumed that as usual this axis is horizontal.

Co-axially mounted in the base is a tubular hub member 9 having at its end that lies nearer to the end wall 1 a radially outward extending flange 10 provided with a stepped, axially projecting ring 11 which locates with the edge of the aperture in the end wall 1 and whereby the hub 9 can be fixed to the end wall by bolts 12. The bore of the hub 9 houses a bush 13 having an external flange 14 at its outer end and having a rectangular bore 15 whose axis is coincident with that of the base and whose major walls 16 (FIGURES 5 and 6) lie in vertical planes. The horizontal distance between the vertical walls 16 corresponds to the width of the largest size of transposed strip conductor with which the head is intended to deal, but the vertical distance between its horizontal walls is greater than the maximum height of such a conductor. Rotatably mounted on the hub 9, by means of bearings 18, and retained thereon by a collar 19 secured to the hub, is a wheel 20 having a rim 21. To the side of the rim 21 which is nearer the end wall 1 of the base of the casing there is secured a chain sprocket ring 22 and to the other side of the rim there is secured a ring cam 23. The ring cam 23 is designed in one quadrant (24 in FIGURE 2) to give a gradual single lift of 0.3125 inch over an arc of 90°, followed by a dwell of nearly 90° in the next quadrant (25 in FIGURE 2) which terminates with a sudden release provided by a step 26 to the initial diameter. The lower side of the circumferential wall 2 of the base of the casing is provided with two apertures 27 to permit the passage of the driving and slack sides of a chain 28 engaging the sprocket ring 22 and driven by a sprocket wheel 29 on a shaft 30 beneath the casing. The shaft 30 is adapted to be driven through a positive form of clutch 80 from a chain sprocket wheel 81 at a speed such that the angular speed of the ring cam 23 is proportional to that of the stranding machine cage with which the head is intended to be used, being "*n*" times that of the cage when "*n*" is an odd number and being "*n*/2" times when "*n*" is an even number, "*n*" being the number of wires to be transposed.

To convert the bush 13 with the rectangular bore 15 into a closing die suitable for a range of conductors of different stack heights it is adapted to be fitted with liners 31 detachably secured to its top and bottom walls by screws passing through holes 32 in these walls and screwing into tapped holes 33 in these liners 31 between which and the top and bottom walls respectively can be inserted one or more distance pieces of appropriate thickness or appropriate aggregate thickness to provide between the facing surfaces of the two liners a distance corresponding to the maximum stack height required. Here it is explained that the term "maximum stack height" is used to mean the height of the taller of the two stacks of any given size of conductor. To provide for conductors built up of strips of different width, we prefer to use bushes that are interchangeable and have bores of which the width between their major surfaces corresponds to twice the width of the strips of which the conductor is built up.

The end wall of the other half of the casing, that is the cover (FIGURES 3 and 4), which is relatively thick, is provided with four channels 34–37 in its inner surface. These channels which are of rectangular cross-section extend across the annular face of the end wall 3 at right angles to one another though not diametrically placed, the longitudinal axis of each channel being off-set from the diametral plane parallel to it to the same extent and in the same sense as those of the remaining channels, as indicated in FIGURE 4. In each channel is a carrier 38 also of channel shaped cross-section of which the external depth corresponds to the depth of the channel housing it but of which the external width is less than the width of that channel except at the outer end of the channel where the channel is locally constricted by the formation of a projection 39 on the side wall 40 of the channel that is the further from the diametral plane parallel to that channel. Each carrier 38 is normally resiliently held in sliding contact with the other side wall 41 of the channel by a tensioned helical spring 42 housed in a channel 43 in the end wall of the cover inclined at an angle of about 30° to the corresponding one of the channels 34–37 housing the carrier. One end of this spring 42 is anchored to a pin 44 on the under side of the carrier 38 near its inner end and the other end of the spring is anchored to a tension adjusting screw 45 extending radially through and in screw-threaded engagement with the circumferential wall 4.

To one side of each of the carrier-housing channels 34–37, namely the side the more remote from the diametral plane to which the channel is parallel, and near the peripheral edge of the cover end wall 3 is bolted a bearing 46 for a centrally pivoted rocker arm 47 (FIGURE 7). One arm 48 of each rocker arm 47 extends above the channel and carries an adjustable pin 49 adapted to bear on a button 50 in the radially outer side face of a lug 51 upstanding from the carrier 38 near its outer end. The adjustable pin 49 screws into a tapped hole in the arm 48 and when set is secured by a lock nut 52. To facilitate digital adjustment of this pin 49 a semi-circular recess 53 is provided in the peripheral wall 3 of the cover in the middle of which recess is the head 54 of the screw. The other arm 55 of each rocker carries a pin 56 which projects from the side face of the arm in the direction away from the end wall 3, its axis being parallel to the axis of the bearing 56 and the axis of the transposing head. This pin 56 carries a roller 57 which rides on the external surface of the ring cam 23 in the base of the casing. As each roller 57 is lifted by the cam 23, its first mentioned arm 48 moves to bring the inner end of its pin 49 into engagement with the button 50 and thereby force the carrier 38 inwards towards the axis of the head against the tension of the spring 42.

Two fingers 58 are a sliding fit, one in each of the two vertically extending carriers 38. Each finger 58 is clamped to the base wall of the carrier by a setscrew 59 passing through a longitudinally extending slot 60 in the finger, thus permitting the position of each of these fingers 58 to be longitudinally adjusted. An adjustable but positive abutment for each finger 58 is provided by a screw 61 working in the end wall 62 of the channelled carrier and bearing on the outer end face of the finger. One longitudinal edge 63 of each of these fingers 58 lies in a diametral plane parallel to its direction of reciprocation with its carrier 38 and the inner end face comprises a part 64 adjoining and at right angles to this longitudinal edge.

This part 64 has a length corresponding to the strip width of the transposed strip conductor to be manufactured and is followed by a chamfered or rounded off part which runs into the opposite longitudinal edge of the finger.

The two horizontally placed carriers 38 are each provided with a channel 65 that is wider than the fingers 66 which they carry. Each of these two fingers 66 is pivotally secured (67) at its outer end to its carrier 38 and is clamped to it by a setscrew 68 passing through a transversely extending slot 69 in the finger 66 so that the inner end of the finger is adjustable laterally with respect to its carrier. The end face 70 of each of these two fingers 66 is inclined at an angle of 60° to the longitudinal edge of the finger that is the nearer to the diametral plane parallel with its direction of reciprocation. The acute corner of each of these fingers is cut away to form a notch 71—the notch having a width a little less than half the width of the finger and a length just over twice its own width. The acute corner thus formed is also cut away to form a second and smaller notch 72 of which the width corresponds to the thickness of a component strip of the conductor to be fabricated and of which the length is a little greater than the width of the strip, e.g. by approximately 0.02 inch. This notched end of the finger 66 projects well beyond its carrier 38—the tip of the finger normally lying on the vertical diametrical plane of the head as shown in FIGURE 4. Accordingly the end 73 of the neighbouring vertical carrier is chamfered off to provide the necessary clearance. The inner ends 74 of the two horizontal carriers 38 are also correspondingly chamfered off, the sharp corners of each carrier being rounded off (75).

From the bottom wall of each carrier 38 at a point near the rounded-off sharp corner 75 projects a link pin 76 passing through the one end of each of two links 77, 78. The other end of one (77) of these links is attached to the link pin 76 on one neighbouring carrier and the other end of the other (78) of these links is attached to the link pin 76 on the other neighbouring carrier. These pins and links form a parallelogram save that the upper and lower links 78 are bowed away from the axis of the head to permit of the manufacture of a transposed multiple strip conductor of greater stack height than would otherwise be the case. By this linkage, as, say, the upper, vertical finger 58 is depressed by cam action to move down the right hand stack of wires (when viewed in the direction downward through the paper in FIGURE 4) the horizontal finger 66 at 3.0 o'clock is simultaneously depressed to the same extent, and as say the other horizontal finger 66 at 9.0 o'clock is depressed by cam action to move the top wire of the left hand stack over the right hand stack the vertical finger at 12.0 o'clock will simultaneously be pushed over to make way for the top wire from the left hand stack, and so on. Owing to this linked connection each carrier 38 may be lifted off its slide bed as indicated, in FIGURE 4 by the tilting of the right hand horizontal carrier in relation to the upper horizontal boundary 41 of the channel 37, but will be pulled back again as soon as possible by its tensioned spring 42.

What I claim as my invention is:

1. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier and means for positively impelling the carriers individually and sequentially towards the axis of the die on the co-planar carrier supporting surfaces.

2. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier and a rotatable ring cam for positively impelling the carriers individually and sequentially towards the axis of the die on the co-planar carrier supporting surfaces.

3. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first part of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier, a rotatable ring cam for positively impelling the carriers individually and sequentially towards the axis of the die on the co-planar carrier supporting surfaces and, between each carrier and the cam, means for adjusting the movement imparted by the cam to the carrier.

4. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier, a rotatable ring cam for positively impelling the carriers individually and sequentially towards the axis of the die on the co-planar carrier supporting surfaces and means for limiting the extent of movement of each carrier in a direction away from the axis of the die.

5. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier, a rotatable ring cam for positively impelling each carrier towards the axis of the die on the carrier supporting surfaces, and links pivotally connected to and coupling together the inner ends of each carrier and the adjacent carriers to limit the outward movement of the carriers and to provide that a cam imparted movement of each carrier imparts outward movement to the adjacent carriers.

6. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, the carriers being movable on the slide beds and carrier-supporting surfaces towards and away from the axis of the die, resilient means for holding each carrier on its slide bed and the carriers being pivoted about their outer ends so as to be pivotally movable away from the slide beds at their inner ends against the force exerted by said resilient means, means for longitudinally adjusting the first pair of fingers on its carrier and means for laterally adjusting each of the second pair of fingers on its carrier and means for positively impelling the carriers individually and sequentially towards the axis of the die.

7. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier, a rotatable ring cam, four centrally pivoted rocker arms each having mounted on one end a roller for engagement by the cam and at the other end a screw adjustable therein to adjust the distance between the inner end of the screw and an adjacent part of one of the carriers, and said ring cam being engageable with each roller to move its rocker arm to cause the screw to engage said adjacent part of the carrier and positively impel the carrier towards the axis of the die, thereby to impel the carriers individually and sequentially towards the axis of the die.

8. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for said carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, means for longitudinally adjusting each of the first pair of fingers on its carrier and means for laterally adjusting each of the second pair of fingers on its carrier and a rotatable ring cam having a lift followed by a dwell for positively impelling the carriers individually and sequentially towards the axis of the die, and by a rapid release to permit movement of each carrier in turn away from that axis.

9. In a machine for making a transposed multiple strip conductor of substantially rectangular cross-section, a transposing head as claimed in claim 8 and in which the rotatable cam ring is provided with a single lift of 90° followed by a dwell of nearly 90°.

10. In a machine for making a transposed multiple strip conductor of substantially rectangular cross-section, a transposing head including a stationary rectangular die, four transposing fingers equally spaced about the axis of the die and mounted adjacent the entry end of the die to engage strips at the corners of the conductor as the strips approach the die, and said fingers comprising a first pair for engaging the strips at two diagonally opposite corners of the conductor and a second pair for engaging the strips at the other two diagonally opposite corners of the conductor, a first and a second pair of carriers for the first and second pair of fingers respectively, mounting means providing for the carriers co-planar supporting surfaces extending in a plane normal to the axis of the die, two first slide beds for the first pair of carriers extending on said mounting means parallel with two opposite walls of the die, two second slide beds for the second pair of carriers extending on said mounting means parallel with the other walls of the die, means for resiliently holding each carrier on its slide bed, the first pair of fingers being each a close sliding fit in, and being longitudinally adjustable in, a channel in its associated carrier, the second pair of fingers being each located in a channel which is provided in its associated carrier and is wider than the finger, each of the second pair of fingers being pivotally secured to its carrier at the radially outer end and being movable about its pivot for lateral adjustment of its radially inner end in its channel, means for releasably securing each finger against movement relative to its carrier, and means for positively impelling the carriers individually and sequentially towards the axis of the die on the co-planar carrier-supporting surfaces.

References Cited in the file of this patent

UNITED STATES PATENTS

| | | |
|---|---|---|
| 1,301,559 | Hermsdorf | Apr. 22, 1919 |
| 2,234,996 | Welch et al. | Mar. 18, 1941 |
| 2,249,509 | Welch et al. | July 15, 1941 |
| 2,305,266 | Lincoln et al. | Dec. 15, 1942 |
| 2,434,159 | Hoernle | Jan. 6, 1948 |